(12) United States Patent
Yashima

(10) Patent No.: US 10,681,254 B2
(45) Date of Patent: Jun. 9, 2020

(54) OPTICAL ELEMENT, OPTICAL APPARATUS, AND IMAGING APPARATUS

(71) Applicant: CANON KABUSHIKI KAISHA, Tokyo (JP)

(72) Inventor: Kumiko Yashima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/262,646

(22) Filed: Jan. 30, 2019

(65) Prior Publication Data

US 2019/0238733 A1    Aug. 1, 2019

(30) Foreign Application Priority Data

Feb. 1, 2018    (JP) ................... 2018-016508
Dec. 18, 2018   (JP) ................... 2018-236577

(51) Int. Cl.
| | | |
|---|---|---|
| *H04N 5/225* | (2006.01) | |
| *G02B 7/02* | (2006.01) | |
| *G02B 27/00* | (2006.01) | |
| *G02B 9/12* | (2006.01) | |

(52) U.S. Cl.
CPC ........... *H04N 5/2254* (2013.01); *G02B 7/021* (2013.01); *G02B 7/025* (2013.01); *G02B 9/12* (2013.01)

(58) Field of Classification Search
None
See application file for complete search history.

(56) References Cited

U.S. PATENT DOCUMENTS 6,639,734 B2 * 10/2003 Omura .............. G02B 17/0808
359/730

FOREIGN PATENT DOCUMENTS

| JP | 2010-266496 A | 11/2010 |
| JP | 2011-102906 A | 5/2011 |

* cited by examiner

*Primary Examiner* — Mark T Monk
(74) *Attorney, Agent, or Firm* — Canon U.S.A., Inc. IP Division

(57) ABSTRACT

Provided is an optical element that has at least a first optical component, a third optical component. A surface of the second optical component facing the first optical component has a convex shape and a surface of the third optical component facing the second optical component has a concave shape. At least one of the first optical component and the second optical component and the second optical component and the third optical component are bonded by an adhesive layer. The condition $0.2 \leq Ead2/Ead1 \leq 0.5$ is satisfied, where Ead1 is an elastic modulus of the adhesion layer at 20 degrees Celsius and Ead2 is an elastic modulus of the adhesion layer at 60 degrees Celsius. The condition of $0.25 \leq \alpha 1/\alpha 3 < 1.0$ is also satisfied, where a1 and a3 are coefficients of linear expansion of the first optical component and the third optical component at 20 degrees Celsius to 60 degrees Celsius, respectively.

10 Claims, 6 Drawing Sheets

OPTICAL ELEMENT, OPTICAL APPARATUS, AND IMAGING APPARATUS

BACKGROUND

Field of the Disclosure

The present disclosure relates to an optical element including a plurality of optical components, an optical apparatus, and an imaging apparatus having the optical element.

Description of the Related Art

An optical element formed of a plurality of optical components used for an optical system such as a digital camera or a video camera as lenses is required to be reduced in size and have high optical performance. In such an optical element, a combined use of different types of materials provides performance that cannot be achieved with a single type of material. Japanese Patent Application Laid-Open No. 2011-102906 proposes an optical element including a plurality of optical components such as a resin, a glass, or the like as an optical element that reduces chromatic aberration, for example.

The optical element in which optical components of different types of materials are combined has problems of being easily deformed and subject to a crack and a cleavage due to low adhesion between materials or due to different characteristics for a temperature change. To solve the problem, Japanese Patent Application Laid-Open No. 2010-266496 suggests an optical element that suppresses generation of stress caused by expansion and contraction deformation due to temperature and humidity.

Even when the optical element formed of optical components having significantly different coefficients of linear expansion has matched coefficients of linear expansion of interposed optical components as specified in Japanese Patent Application Laid-Open No. 2010-266496, deformation of the optical element or peeling at the interface between the optical components is still likely to occur.

To solve the problem of peeling at the interface, a thermosetting or photocurable resin material is molded to form an optical component, which is then bonded with the other optical component with an adhesive layer formed of an adhesive agent to thereby suppress deformation. Since the elastic modulus of the adhesive layer becomes significantly low at a high temperature, peeling at the interface between the two different optical components can be suitably prevented. In the optical element using such an adhesive layer, however, the surface shape significantly changes when the temperature is increased and then decreased to the original temperature, and therefore there is a possibility of reduction in the optical performance.

SUMMARY

The present disclosure intends to provide an optical element with less surface shape change before and after heating while preventing peeling of optical components formed of different materials.

An optical element in the present disclosure has at least: a first optical component; a third optical component; and a second optical component between the first optical component and the third optical component, at least one of the first optical component and the second optical component and the second optical component and the third optical component are bonded to each other by an adhesive layer, a surface of the first optical component facing the second optical component has a convex shape, a surface of the third optical component facing the second optical component has a concave shape, Formula (1) is satisfied:

$$0.2 \leq Ead2/Ead1 \leq 0.5 \tag{1},$$

where Ead1 is an elastic modulus of the adhesion layer at 20 degrees Celsius and Ead2 is an elastic modulus of the adhesion layer at 60 degrees Celsius, and Formula (2) is satisfied:

$$0.25 \leq \alpha1/\alpha3 < 1.0 \tag{2},$$

where $\alpha1$ and $\alpha3$ are coefficients of linear expansion of the first optical component and the third optical component at 20 degrees Celsius to 60 degrees Celsius, respectively.

Further features of the present invention will become apparent from the following description of exemplary embodiments with reference to the attached drawings.

DESCRIPTION OF THE EMBODIMENTS

The embodiment of the present invention will be described below.

Optical Element

Figure 1:
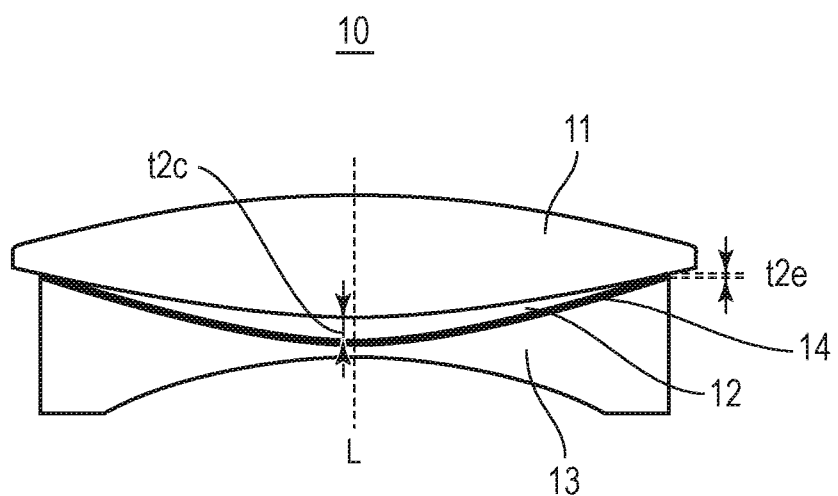
FIG. 1 is a sectional view of an optical element in one embodiment.

An optical element, in one embodiment, is formed of at least three optical components as illustrated in FIG. 1. An optical element 10 has at least a first optical component 11, a second optical component 12, and a third optical component 13. The first optical component 11 and the second optical component 12 is bonded by an adhesive layer 14. The second optical component 12 and the third optical component 13 may also be bonded by an adhesive layer 14 formed of an adhesive agent. The following description will be provided by using examples in which the second optical component 12 and the third optical component 13 are bonded by the adhesive layer 14.

A surface of the first optical component 11 facing the second optical component 12 has a convex shape. A glass or a plastic can be used for forming the first optical component 11, for example. To have a small volume change due to a temperature change small, a glass is preferably used for the first optical component 11. The coefficient of linear expansion of the first optical component is preferably greater than or equal to $30 \times 10^{-7}$/degrees Celsius and less than or equal to $81 \times 10^{-7}$/degrees Celsius.

A component in which the maximum thickness t2c in a direction of an optical axis L ranges from 0.3 mm or greater and 10 mm or less can be used for the second optical component. The maximum thickness t2c is preferably greater than or equal to 0.3 mm and less than or equal to 2.0 mm. The optical axis L passes through the center of the optical element 10 when the optical element 10 is viewed from the light incidence direction. Therefore, the maximum thickness t2c can be expressed as a thickness in the normal direction starting from the center of the first optical component 11 or the third optical component 13. An organic material such as a resin can be used for the second optical component 12, for example. For the second optical component 12, for example, a resin in which a d-line refractive index "nd" is 1.60 or greater and 1.67 or less, an Abbe number "vd" is 16.7 or greater and 21.5 or less, a partial dispersion ratio "θgF" is 0.70 or greater and 0.76 or less may be used. Using a material having such a high "θgF" enables a design of an optical system that efficiently reduce a chromatic aberration of a short wavelength light in visible light.

The second optical component 12 may be made from material such a resin obtained by polymerizing or copolymerizing a compound represented by Chemical Formula (1) having an acryloyl group or a methacryloyl group as follows.

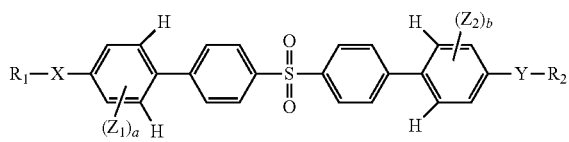
(1)

In Chemical Formula (1), X and Y are any substituent selected from the substituents illustrated in Chemical Formula (2) below, respectively.

| | | (2) |
|---|---|---|
| *—S— | *—O— | |
| *—O—CH$_2$CH$_2$—O— | *—O—CH$_2$CH$_2$—S— | |
| *—S—CH$_2$CH$_2$—O— | *—S—CH$_2$CH$_2$—S— | |
| *—O—CH$_2$CH$_2$CH$_2$—O— | *—O—CH$_2$CH$_2$CH$_2$—S— | |
| *—S—CH$_2$CH$_2$CH$_2$—O— | *—S—CH$_2$CH$_2$CH$_2$—S— | |
| *—S—CH$_2$CH$_2$CH$_2$CH$_2$—S— | *—O—CH$_2$CH$_2$CH$_2$CH$_2$—O— | |
| *—O—CH$_2$CH$_2$CH$_2$CH$_2$—S— | *—S—CH$_2$CH$_2$CH$_2$CH$_2$—O— | |

(In Chemical Formula (2), the symbol "*" represents an atomic bonding to $R_1$ or $R_2$.)

$R_1$ and $R_2$ are any of substituents selected from a hydrogen atom, an alkyl group having one to two carbon atoms, and a (meth) acryloyl group, respectively. The symbols $Z_1$ and $Z_2$ are any of substituents selected from a hydrogen atom, a halogen atom, an alkoxy group having one to two carbon atoms, an alkylthio group having one to two carbon atoms, an unsubstituted alkyl group having one to two carbon atoms, and a substituent represented by the following Chemical Formula (3), respectively.

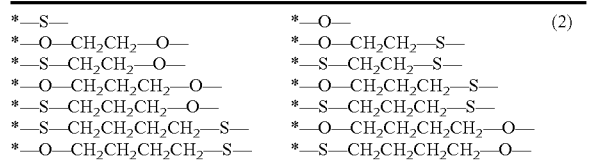
(3)

(In Chemical Formula (3), the symbol "**" represents an atomic bonding, "m" is zero or one, "n" is any of integers of two to four, and "R" is a hydrogen atom or a methyl group.)

The representations "a" and "b" are any of integers from zero to two, respectively. When "a" is two, the two $Z_1$ may be the same or different. When "b" is two, the two $Z_2$ may be the same or different.

A surface of the third optical component 13 facing the second optical component has a concave shape. A glass or a plastic can be used for the third optical component 13, for example. To have a small volume change due to temperature change, a glass is preferably used for the third optical component 13. The coefficient of linear expansion of the third optical component 13 is preferably greater than or equal to 66×10$^{-7}$/degrees Celsius and less than or equal to 136×10$^{-7}$/degrees Celsius.

An acrylic photocurable resin can be used for the adhesive agent that forms the adhesive layer 14, an epoxy curable resin, or the like, for example. An acrylic photocurable resin is preferably used because of an excellent moldability among these resins. The adhesive layer 14 satisfies the following Formula (1) where Ead1 denotes the elastic modulus at 20 degrees Celsius and Ead2 denotes the elastic modulus at 60 degrees Celsius.

$$0.2 \leq Ead2/Ead1 \leq 0.5 \tag{1}$$

When 0.2>Ead2/Ead1, the elastic modulus of the adhesive layer 14 is excessively low at a high temperature, and thereby peeling occurs at the interface of the optical components. Further, when Ead2/Ead1>0.5, the adhesive layer 14 is less likely to elastically deform at a high temperature, and thereby peeling occurs at the interface of the optical components.

Since the elastic modulus at 60 degrees Celsius is lower than the elastic modulus at 20 degrees Celsius, the adhesive layer 14 that satisfies Formula (1) of the present embodiment is likely to be deformed at a high temperature. Therefore, in the optical element 10 in which a plurality of optical components having significant difference between coefficients of linear expansion are bonded, peeling of the optical components caused at a high temperature can be suppressed. Further, although not particularly limited, the thickness of the adhesive layer 14 is greater than or equal to 10 μm and less than or equal to 30 μm, for example.

The inventors have found that the optical element 10 using an adhesive layer which satisfies Formula (1) and is likely to be thermally deformed at a high temperature has a problem of reduction in optical performance due to deformation of the adhesive layer when the temperature is increased and then decreased to the original temperature. This is because the adhesive layer is deformed such that the curvature becomes smaller (the radius of curvature becomes larger) compared to the original shape when the temperature is increased and then decreased to the original temperature.

The optical element 10 of the present embodiment satisfies the following Formula (2), where the coefficients of linear expansion of the first optical component 11 and the third optical component 13 at 20 degrees Celsius to 60 degrees Celsius are denoted as α1 and α3, respectively.

$$0.25 \leq \alpha 1/\alpha 3 < 1.0 \tag{2}$$

When Formula (2) is satisfied, since the third optical component 13 works to increase the curvature of the adhesive layer 14, it is considered that the optical element 10 of the present embodiment can suppress the shape change of the adhesive layer 14 when the temperature is increased and then decreased to the original temperature and can prevent reduction in the optical performance.

When 0.25>α1/α3 in the optical element 10, since the coefficients of linear expansion of the first optical component 11 and the third optical component 13 are significantly different from each other, the shape change of the adhesive layer 14 at a high temperature increases, and thereby the shape change remains even after the temperature is cooled to the original temperature, which results in reduction in the optical performance. When α1/α3≥0.1, when the adhesive layer 14 is heated to a high temperature and then cooled to the original temperature, because of weak restoring force for restoring the surface shape change of the adhesive layer 14, the shape change is large when the temperature is increased and then decreased to the original temperature.

The coefficients of linear expansion of the first optical component 11, the second optical component 12, and the third optical component 13 at 20 degrees Celsius to 60 degrees Celsius are denoted as α1, α2, and α3, respectively. When Formulae (3) and (4) below are satisfied, the optical element 10 of the present embodiment can suppress peeling at the interface of the optical components.

$$9.0 \leq \alpha 2/\alpha 1 \leq 24.5 \tag{3}$$

$$5.0 \leq \alpha 2/\alpha 3 \leq 11.0 \tag{4}$$

Further, when the following Formula (5) where "t2c" denotes the maximum thickness of the second optical component 12 in the optical axis L direction and "t2e" denotes the thickness of the outer diameter is satisfied, this is preferable because restoring force for restoring the shape change of the adhesive layer 14 increases.

$$0.005 \leq t2e/t2c < 0.95 \tag{5}$$

In addition, it is further preferable that "t2e/t2c" satisfy the following Formula (6).

$$0.005 \leq t2e/t2c \leq 0.05 \tag{6}$$

Optical Apparatus

Figure 6:
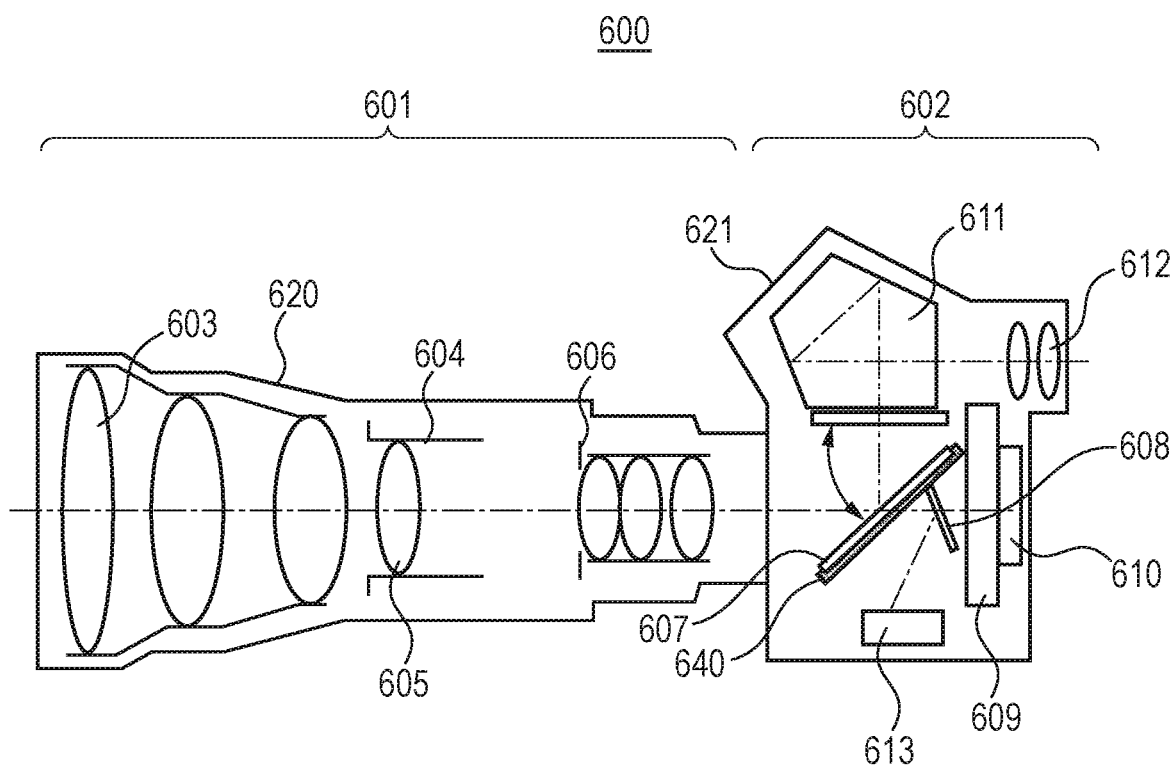
FIG. 6 is a diagram illustrating an imaging apparatus of the present embodiment.

FIG. 6 illustrates a configuration of a single lens reflex digital camera, which is an example of a preferable embodiment of an imaging apparatus of the present invention. Although a camera main body 602 and a lens barrel 601, which is an optical apparatus, are coupled to each other in FIG. 6, the lens barrel 601 is a so-called interchangeable lens that is removable from the camera main body 602.

A light from a subject is captured through an optical system, which is formed of a plurality of lenses 603 and 605, and the like aligned in an optical axis of an imaging optical system within a casing 620 of the lens barrel 601. The optical element of the present embodiment may be used for the lens 603 or 605, for example.

The lens 605 here is supported by an inner barrel 604 so as to be movable to an outer barrel of the lens barrel 601 in order to perform focusing or zooming.

In an observation period before image capturing, a light from the subject is reflected by a main mirror 607 inside a casing 621 of the camera main body and is transmitted through a prism 611, and thereby a captured image is displayed to a photographer through a finder lens 612. Since the main mirror 607 is, for example, a half-mirror, a light transmitted through the main mirror is reflected to a direction of an autofocus (AF) unit 613 by a sub mirror 608, and the reflected light is used for distance measurement, for example. Further, the main mirror 607 is attached and supported by a main mirror holder 640 by adhesion or the like. By the operation of a drive mechanism (not illustrated), when an image is captured, the main mirror 607 and the sub mirror 608 are moved outside the optical path, a shutter 609 is opened, and a captured light image from the lens barrel 601 is received (captured) on the image pickup element 610.

Further, an aperture 606 is configured such that the brightness or the depth of focus at image capturing can be changed by changing an area of an opening.

Manufacturing Method of Optical Element

The manufacturing method of the optical element of the present embodiment will be described with reference to the drawings.

Figure 2A:
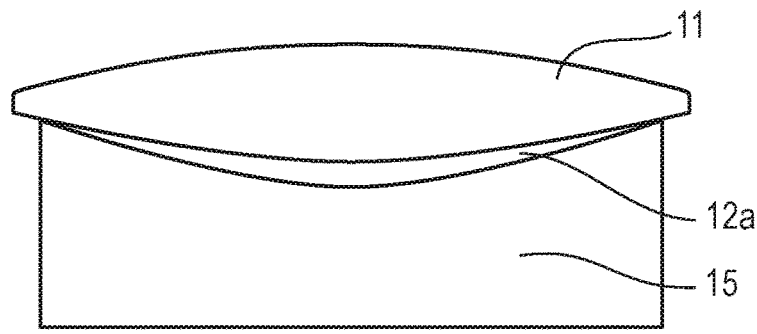
FIGS. 2A, 2B, 2C and 2D are a diagram illustrating a manufacturing method of the optical element of the embodiment as shown in FIG. 1.

First, as illustrated in FIG. 2A, an uncured ultraviolet-curable resin 12a is filled between a glass of the first optical component 11 and a mold 15.

Figure 2B:
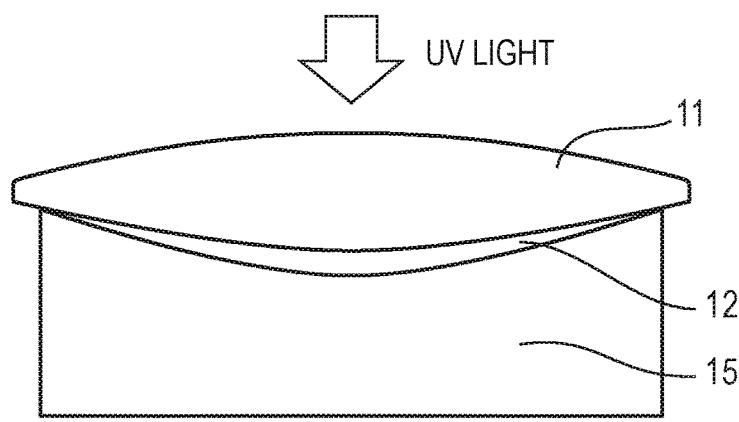

Next, as illustrated in FIG. 2B, the uncured ultraviolet-curable resin 12a is irradiated with a ultraviolet ray from the first optical component 11 side to provide an cured ultraviolet-curable resin as the second optical component 12 on a glass of the first optical component 11.

Figure 2C:
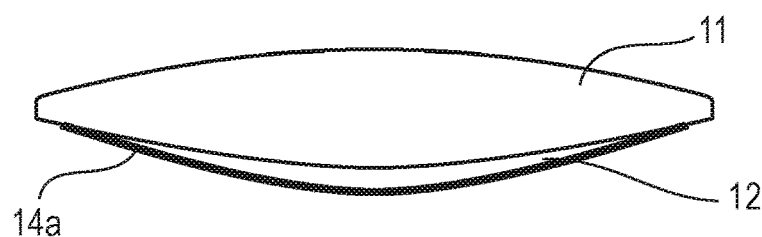

As illustrated in FIG. 2C, an adhesive agent 14a containing an uncured ultraviolet-curable resin is applied to a surface side of the second optical component 12 that is not in contact with the first optical component 11 by using a dispenser or the like (not illustrated).

Figure 2D:
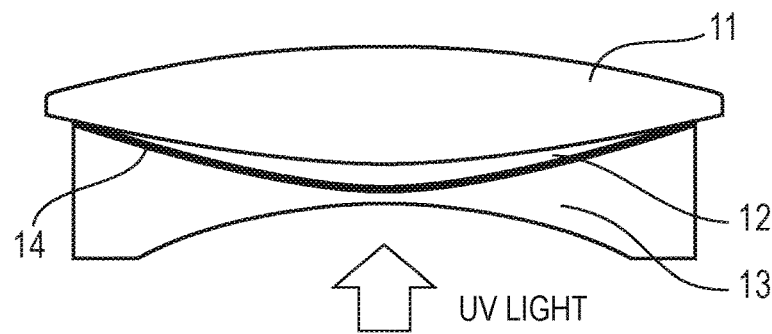

As illustrated in FIG. 2D, the cured ultraviolet-curable resin of the second optical component 12 and a glass of the concave-shaped third optical component 13 are bonded by the adhesive agent 14a. The adhesive agent 14a is then irradiated with a ultraviolet ray from the third optical component 13 side to provide an adhesive layer 14, and thereby the optical element 10 is formed.

Since the order of forming and bonding of the optical components in the manufacturing method of the optical element may be changed, the second optical component 12 may be formed on the concave-shaped third optical component 13, and then the first optical component 11 may be bonded by the adhesive agent 14a to prepare the optical element.

EXAMPLES

Although the present invention will be described in more detail by using the examples hereinafter, the present invention is not limited to the examples described below unless exceeding the spirit thereof.

Measurement and evaluation were performed by the following methods in examples and comparative examples.

Heat Dulability

In the evaluation of heat dulability of the optical element, first the optical element was heated at 20 degrees Celsius to 60 degrees Celsius over 40 minutes, was maintained at 60 degrees Celsius for 10 minutes, and then cooled in an environment of a room temperature of 20 degrees Celsius. The temperature of the optical element was then confirmed to be 25 degrees Celsius or lower in one hour after the start of cooling. Then, the surface shapes of the first optical component 11 and the third optical component 13 were measured by using a laser interferometer GPI (manufactured by ZYGO Co., Ltd.), and the changes in the surface shapes were converted into Newton rings and determined. When a design value of the surface shape of an optical component is denoted as a spherical surface R, the case where R changes in a direction in which R decreases is denoted as plus, and the case where R changes in a direction in which R increases is denoted as minus. Heat dulability was evaluated in accordance with the following criteria:

A: Each change of the Newton rings of the first optical component 11 and the third optical component 13 is within minus three to plus three, and the total Newton ring changes of the first optical component 11 and the third optical component 13 is within four, and therefore heat dulability is high.

B: A change of the Newton rings of the first optical component 11 or the third optical component 13 exceeds minus three or exceeds plus three, or the total Newton ring change of the first optical component 11 and the third optical component 13 is over four, there is room for improvement in heat dulability.

Elastic Modulus

The elastic modulus of an cured ultraviolet-curable resin, an adhesive layer, or the like was measured by using a sample for measurement prepared by cutting the optical element. Specifically, elastic moduluses were measured by using Nanoindenter G200 (manufactured by Keysight Technologies). In order to measure the temperature dependency of an elastic modulus, elastic moduluses were measured every 10 degrees Celsius in a setting where the temperature was increased by 2 degrees Celsius per minute from 20 degrees Celsius to 60 degrees Celsius by using a heating stage.

Coefficient of Linear Expansion

The coefficient of linear expansion of an cured ultraviolet-curable resin, an adhesive layer, or the like was measured by a thermomechanical analyzer using a TMA method with a sample for measurement prepared by cutting the optical element. Specifically, the measurement sample was measured for expansion and contraction when the temperature was changed with a constant load being applied. The temperature was increased from 20 degrees Celsius to 80 degrees Celsius over 10 minutes, maintained at 80 degrees Celsius for 10 minutes, and then decreased from 80 degrees Celsius to 20 degrees Celsius over 10 minutes. Typically, since the first measured value is likely to reflect an error significantly, three cycles of measurement were performed in which a set of an increase and a decrease of the temperature was defined as one cycle, and then the average value was calculated from two data except the data of the first time to obtain the coefficient of linear expansion.

Peeling

After preparing the optical element, a peeling test was performed by heating the optical element to a high temperature in an oven. Specifically, the prepared optical element was set in the oven, the temperature was increased from 20 degrees Celsius to 60 degrees Celsius over four hours, maintained at 60 degrees Celsius for one hour, and then decreased from 60 degrees Celsius to 20 degrees Celsius over four hours. Determination of peeling was observed by using a microscope for the optical element resulted after one hour has elapsed from the cooling, and the presence or absence of peeling was determined. As a result of microscopic observation, a case where peeling was not observed was defined as "A". The optical element having the evaluation "A" means that an optical element has high dulability. Further, as a result of microscopic observation, a case where one or more peelings were observed was defined as "B". The optical element having the evaluation "B" means that there is room for improvement in dulability.

Example 1

In Example 1, an optical element having a shape illustrated in FIG. 1 was prepared.

An uncured acrylic UV curing resin 12a was applied between an optical glass of a first optical component 11 (elastic modulus at 20 degrees Celsius was 118 GPa, the coefficient of linear expansion at 20 degrees Celsius to 60 degrees Celsius was $62 \times 10^{-7}$/degrees Celsius) and a mold 15. The acrylic UV curing resin was irradiated with a ultraviolet ray from the first optical component 11 side by using a high-pressure mercury lamp (EXECURE 250, HOYA CANDEO OPTRONICS Co., Ltd.) to be cured. Irradiation condition of the ultraviolet ray was 25 mW/cm$^2$ for 200 seconds. In such a way, the acrylic UV curing resin (elastic modulus at 20 degrees Celsius was 2.6 GPa, the coefficient of linear expansion was $728 \times 10^{-7}$/degrees Celsius) of a second optical component 12 was provided onto the glass of the first optical component 11. The thickness in the optical axis direction of the second optical component 12 was 1 mm, and the thickness of the outer periphery was 0.05 mm.

Then, an adhesive agent 14a was applied to the surface of the second optical component 12 that was not in contact with the first optical component 11 to bond the second optical component 12 and the third optical component 13. An acrylic UV curing resin was used as the adhesive agent 14a, and irradiation condition of the ultraviolet ray was 10 mW/cm$^2$ for 100 seconds. In the adhesive layer 14 formed of the cured adhesive agent 14a in such a way, an elastic modulus at 20 degrees Celsius was 0.65 GPa, an elastic modulus at 60 degrees Celsius was 0.23 GPa, and a ratio of the elastic modulus at 20 degrees Celsius to the elastic modulus at 60 degrees Celsius was 0.35. In addition, the thickness of the adhesive layer 14 was 20 μm. The third optical component 13 was formed by using an optical glass (elastic modulus at 20 degrees Celsius was 90 GPa, the coefficient of linear expansion at 20 degrees Celsius to 60 degrees Celsius was $66 \times 10^{-7}$/degrees Celsius).

The configuration and the evaluation results of the optical element of Example 1 are summarized in Table 1.

Comparative Example 1

In Comparative Example 1, an optical element was manufactured in the same manner as in Example 1 except that the first optical component 11 and the third optical component 13 were replaced with those described in Table 1. Specifically, an optical glass having the elastic modulus at 20 degrees Celsius at 118 GPa and the coefficient of linear expansion at 20 degrees Celsius to 60 degrees Celsius at $69 \times 10^{-7}$/degrees Celsius was used for both of the first optical component 11 and the third optical component 13.

The configuration and the evaluation results of the optical element of Comparative Example 1 are summarized in Table 1.

Example 2

Figure 3:
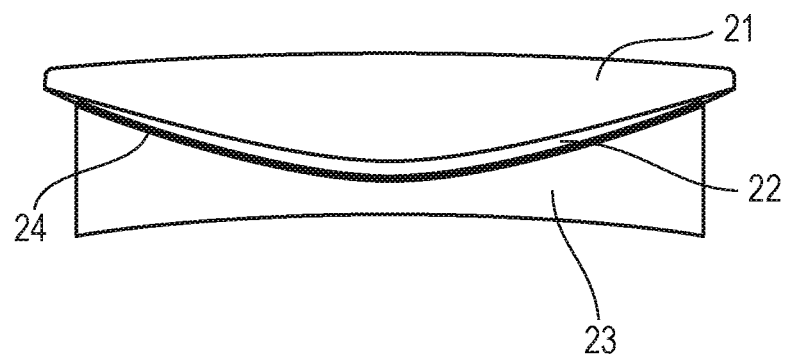
FIG. 3 is a sectional view of an optical element of Example 2.

In Example 2, an optical element having a shape in FIG. 3 was manufactured.

In Example 2, an optical glass having an elastic modulus at 20 degrees Celsius at 82 GPa and the coefficient of linear expansion at 20 degrees Celsius to 60 degrees Celsius at $30 \times 10^{-7}$/degrees Celsius was used for a first optical component 21. An acrylic UV curing resin having an elastic modulus at 20 degrees Celsius at 2.6 GPa and the coefficient of linear expansion at 20 degrees Celsius to 60 degrees Celsius at $728 \times 10^{-7}$/degrees Celsius was used for a second optical component 22. The second optical component 22 was formed on the first optical component 21, resulting in the maximum thickness in the optical axis direction of 1 mm and the thickness of an outer periphery of 0.03 mm.

An optical glass having an elastic modulus at 76 GPa and the coefficient of linear expansion at $117 \times 10^{-7}$/degrees Celsius was used for a third optical component 23. The optical element was manufactured in the same manner as in Example 1 except for these changes.

The configuration and the evaluation results of the optical element of Example 2 are summarized in Table 1.

Comparative Example 2

In Comparative Example 2, an optical element having a shape in FIG. 3 was manufactured.

An optical glass having an elastic modulus at 20 degrees Celsius at 82 GPa and the coefficient of linear expansion at 20 degrees Celsius to 60 degrees Celsius at $30 \times 10^{-7}$/degrees Celsius was used for the first optical component 21. An acrylic UV curing resin having an elastic modulus at 20 degrees Celsius at 2.6 GPa and the coefficient of linear expansion at 20 degrees Celsius to 60 degrees Celsius at $728 \times 10^{-7}$/degrees Celsius was used for the second optical component 22. The second optical component 22 was formed on the first optical component 21, resulting in the maximum thickness in the optical axis direction of 1 mm and the thickness of an outer periphery of 0.03 mm. An optical glass having an elastic modulus at 20 degrees Celsius at 70 GPa and the coefficient of linear expansion at 20 degrees Celsius to 60 degrees Celsius at $145 \times 10^{-7}$/degrees Celsius was used for the third optical component 23. The optical element was manufactured in the same manner as in Example 1 except for these changes. The configuration and the evaluation results of the optical element of Comparative Example 2 are summarized in Table 1.

Example 3

Figure 4:
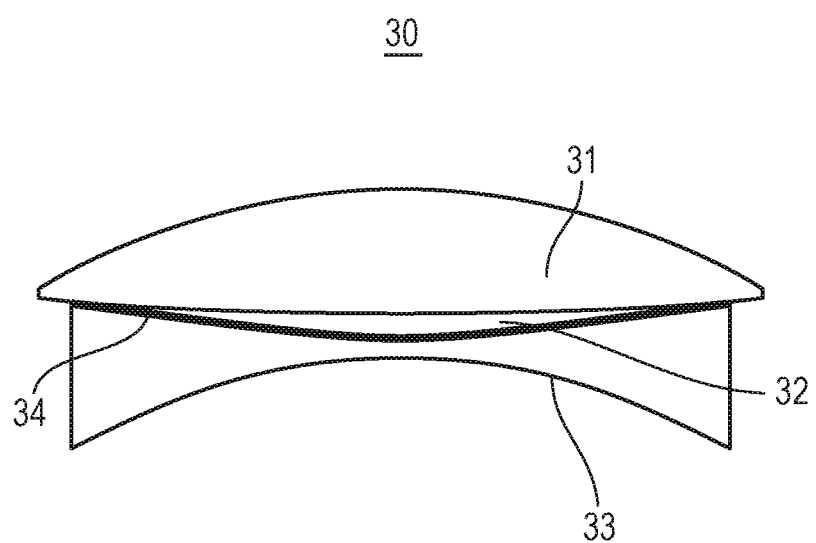
FIG. 4 is a sectional view of an optical element of Example 3.

In Example 3, an optical element having a shape illustrated in FIG. 4 was manufactured.

In Example 3, an optical glass having an elastic modulus at 20 degrees Celsius at 80 GPa and the coefficient of linear expansion at 20 degrees Celsius to 60 degrees Celsius at $72 \times 10^{-7}$/degrees Celsius was used for a first optical component 31. An acrylic UV curing resin having an elastic modulus at 20 degrees Celsius at 2.6 GPa and the coefficient of linear expansion at 20 degrees Celsius to 60 degrees Celsius at $728 \times 10^{-7}$/degrees Celsius was used for a second optical component 32. The second optical component 32 was formed on the first optical component 31, resulting in the maximum thickness in the optical axis direction of 1 mm, and the thickness of an outer periphery of 0.01 mm.

An optical glass having an elastic modulus at 20 degrees Celsius at 76 GPa and the coefficient of linear expansion at 20 degrees Celsius to 60 degrees Celsius at $117 \times 10^{-7}$/degrees Celsius was used for a third optical component 33. The elastic modulus of an adhesive layer 34 was 1.87 GPa at 20 degrees Celsius and 0.63 GPa at 60 degrees Celsius, and the ratio of the elastic modulus at 20 degrees Celsius to the elastic modulus at 60 degrees Celsius was 0.34. In addition, the thickness of the adhesive layer 34 was 20 μm. The optical element was manufactured in the same manner as in Example 1 except for these materials and configuration.

The configuration and the evaluation results of the optical element of Example 3 are summarized in Table 1.

Example 4

In Example 4, an optical element having a shape in FIG. 1 was manufactured. In Example 4, an optical glass having an elastic modulus at 20 degrees Celsius at 78 GPa and the coefficient of linear expansion at 20 degrees Celsius to 60 degrees Celsius at $81 \times 10^{-7}$/degrees Celsius was used for the first optical component 11. An acrylic UV curing resin having an elastic modulus at 20 degrees Celsius at 2.6 GPa and the coefficient of linear expansion at 20 degrees Celsius to 60 degrees Celsius at $728 \times 10^{-7}$/degrees Celsius was used for the second optical component 12. The second optical component 12 was formed on the first optical component 11, resulting in the maximum thickness in the optical axis direction of 1 mm and the thickness of an outer periphery of 0.05 mm. An optical glass having an elastic modulus at 20 degrees Celsius at 70 GPa and the coefficient of linear expansion at 20 degrees Celsius to 60 degrees Celsius at $136 \times 10^{-7}$/degrees Celsius was used for the third optical component 13. The elastic modulus of the adhesive layer 14 was 0.31 GPa at 20 degrees Celsius and 0.15 GPa at 60 degrees Celsius, and the ratio of the elastic modulus at 20 degrees Celsius to the elastic modulus at 60 degrees Celsius was 0.48. In addition, the thickness of the adhesive layer 14 was 20 μm. The optical element was manufactured in the same manner as in Example 1 except for these materials and configuration.

The configuration and the evaluation results of the optical element of Example 4 are summarized in Table 1.

Example 5

In Example 5, an optical element having a shape in FIG. 1 was manufactured. In Example 5, an optical glass having an elastic modulus at 20 degrees Celsius at 80 GPa and the coefficient of linear expansion at 20 degrees Celsius to 60 degrees Celsius at $72 \times 10^{-7}$/degrees Celsius was used for the first optical component 11. An acrylic UV curing resin having an elastic modulus at 20 degrees Celsius at 2.6 GPa and the coefficient of linear expansion at 20 degrees Celsius to 60 degrees Celsius at $728 \times 10^{-7}$/degrees Celsius was used for the second optical component 12. The second optical component 12 was formed on the first optical component 11, resulting in the maximum thickness in the optical axis direction of 1 mm and the thickness of an outer periphery of 0.05 mm.

An optical glass having an elastic modulus at 20 degrees Celsius at 76 GPa and the coefficient of linear expansion at 20 degrees Celsius to 60 degrees Celsius at $117 \times 10^{-7}$/degrees Celsius was used for the third optical component 13. In the adhesive layer 14, the elastic modulus at 20 degrees Celsius was 0.62 GPa, the elastic modulus at 60 degrees Celsius was 0.13 GPa, and the ratio of the elastic modulus at 20 degrees Celsius to the elastic modulus at 60 degrees Celsius was 0.21. In addition, the thickness of the adhesive layer 14 was 20 μm. The optical element was manufactured in the same manner as in Example 1 except for these materials and configuration.

The configuration and the evaluation results of the optical element of Example 5 are summarized in Table 1.

Example 6

Figure 5:
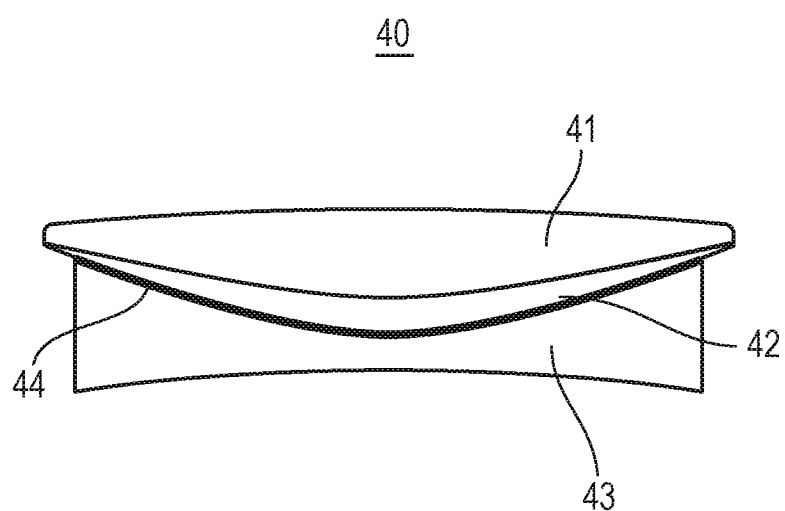
FIG. 5 is a sectional view of an optical element of Example 6.

In Example 6, an optical element having a shape in FIG. 5 was manufactured. An optical glass having an elastic modulus at 20 degrees Celsius at 118 GPa and the coefficient of linear expansion at 20 degrees Celsius to 60 degrees Celsius at $62 \times 10^{-7}$/degrees Celsius was used for a first optical component 41. An acrylic UV curing resin having an elastic modulus at 20 degrees Celsius at 2.6 GPa and the coefficient of linear expansion at 20 degrees Celsius to 60 degrees Celsius at $728 \times 10^{-7}$/degrees Celsius was used for a second optical component 42. The second optical component 42 was formed on the first optical component 41, resulting in the maximum thickness in the optical axis direction of 2 mm and the thickness of an outer periphery of 0.01 mm. An optical glass having an elastic modulus at 20 degrees Celsius at 76 GPa and the coefficient of linear expansion at 20 degrees Celsius to 60 degrees Celsius at $117 \times 10^{-7}$/degrees Celsius was used for a third optical component 43. The optical element was manufactured in the same manner as in Example 1 except for these materials and configuration.

The configuration and the evaluation results of the optical element of Example 6 are summarized in Table 1.

TABLE 1

| | | Unit | Example 1 | Comperative Example 1 | Example 2 | Comperative Example 2 | Example 3 | Example 4 | Example 5 | Example 6 |
|---|---|---|---|---|---|---|---|---|---|---|
| Shape | Shape of the combined optical device | none | FIG. 1 | FIG. 1 | FIG. 3 | FIG. 3 | FIG. 4 | FIG. 1 | FIG. 1 | FIG. 5 |
| Coefficient of linear expansion | a1 (The coefficient of linear expansion of the first optical component) | $\times 10^{-7}$/degrees Celsius | 62 | 69 | 30 | 30 | 72 | 81 | 72 | 62 |
| | a2 (The coefficient of linear expansion of the second optical component) | $\times 10^{-7}$/degrees Celsius | 728 | 728 | 728 | 728 | 728 | 728 | 728 | 728 |
| | a3 (The coefficient of linear expansion of the third optical component) | $\times 10^{-7}$/degrees Celsius | 66 | 69 | 117 | 145 | 117 | 136 | 117 | 117 |
| | a1/a3 | none | 0.94 | 1.00 | 0.26 | 0.21 | 0.62 | 0.60 | 0.62 | 0.53 |
| | a2/a1 | none | 11.7 | 10.6 | 24.3 | 24.3 | 10.1 | 9.0 | 10.1 | 11.7 |
| | a2/a3 | none | 11.0 | 10.6 | 6.2 | 5.0 | 6.2 | 5.4 | 6.2 | 6.2 |
| Elastic modulus | Ead1 (Elastic module of the adhesive material at 20 degrees Celsius) | GPa | 0.65 | 0.65 | 0.65 | 0.65 | 1.87 | 0.31 | 0.62 | 0.65 |
| | Ead2 (Elastic modulus of the adhesive material at 60 degrees Celsius) | GPa | 0.23 | 0.23 | 0.23 | 0.23 | 0.63 | 0.15 | 0.13 | 0.23 |
| | Ead2/Ead1 | none | 0.35 | 0.35 | 0.35 | 0.35 | 0.34 | 0.48 | 0.21 | 0.35 |
| Thickness | t2c (the second optical component in the optical axis) | mm | 1.00 | 1.00 | 1.00 | 1.00 | 1.00 | 1.00 | 1.00 | 2.00 |
| | t2e (the periphery of the second optical component) | mm | 0.05 | 0.05 | 0.03 | 0.03 | 0.01 | 0.05 | 0.05 | 0.01 |
| | t2e/t2c | none | 0.05 | 0.05 | 0.03 | 0.03 | 0.01 | 0.05 | 0.05 | 0.005 |
| Evaluation | Newton rings | The first optical component | Number of the rings | −1.5 | −2.7 | +2.7 | +3.1 | +2.4 | +2.6 | +2.1 | −1.4 |
| | | The third optical component | Number of the rings | −1.8 | −2.1 | −0.2 | −0.2 | −0.2 | −0.5 | −0.7 | −1.8 |
| | | Total | Number of the rings | 3.3 | 4.8 | 2.9 | 3.3 | 2.6 | 3.1 | 2.8 | 3.2 |
| | Determination | | none | A | B | A | B | A | A | A | A |

Peeling at Interface of Optical Components

In the optical element of Example 1, occurrence of peeling between the optical components was observed by using adhesive layers having different elastic moduluses as illustrated in Table 2.

The elastic moduluses and the evaluation results of the adhesive layers of Reference Examples 1 to 6 using adhesive layers having different elastic moduluses are illustrated in Table 2.

TABLE 2

| | Unit | Reference Example 1 | Reference Example 2 | Reference Example 3 | Reference Example 4 | Reference Example 5 | Reference Example 6 |
|---|---|---|---|---|---|---|---|
| Ead1 (Elastic module of the adhesive material at 20 degrees Celsius) | GPa | 1.81 | 0.61 | 0.31 | 1.87 | 0.62 | 0.11 |
| Ead2 (Elastic modulus of the adhesive material at 60 degrees Celsius) | GPa | 1.35 | 0.33 | 0.15 | 0.63 | 0.13 | 0.01 |
| Ead2/Ead1 | none | 0.75 | 0.54 | 0.48 | 0.34 | 0.21 | 0.09 |
| Determination | none | B | B | A | A | A | B |

Evaluation

From Reference Examples 1 to 6, peeling between the optical components can be prevented when an adhesive layer having an elastic modulus that satisfies Formula (1) is used.

From Examples 1 to 6, in the optical element that satisfies Formula (2), the surface shape change is small when the temperature is increased and then decreased to the room temperature, and the excellent optical performance is obtained. According to the present embodiment, an optical element in which peeling of different optical components is prevented and the surface shape change is small when the temperature is increased and then decreased to the room temperature can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-016508, filed Feb. 1, 2018, and Japanese Patent Application No. 2018-236577, filed Dec. 18, 2018, which are hereby incorporated by reference herein in their entirety.

What is claimed is:

1. An optical element comprising at least:
   a first optical component;
   a third optical component; and
   a second optical component between the first optical component and the third optical component,
   wherein at least one of the first optical component and the second optical component and the second optical component and the third optical component are bonded to each other by an adhesive layer,
   wherein a surface of the first optical component facing the second optical component has a convex shape,
   wherein a surface of the third optical component facing the second optical component has a concave shape,
   wherein Formula (1) is satisfied:

$$0.2 \leq Ead2/Ead1 \leq 0.5 \quad (1),$$

where Ead1 is an elastic modulus of the adhesion layer at 20 degrees Celsius and Ead2 is an elastic modulus of the adhesion layer at 60 degrees Celsius, and
   wherein Formula (2) is satisfied:

$$0.25 \leq \alpha1/\alpha3 < 1.0 \quad (2),$$

where $\alpha1$ is a coefficient of linear expansion of the first optical component at 20 degrees Celsius to 60 degrees Celsius and $\alpha3$ is a coefficient of linear expansion of the third optical component at 20 degrees Celsius to 60 degrees Celsius.

2. The optical element according to claim 1, wherein the second optical component includes a resin having a maximum thickness in an optical axis direction ranges from 0.3 mm to 10 mm.

3. The optical element according to claim 2, wherein the maximum thickness of the second optical component in the optical axis direction is less than or equal to 2 mm.

4. The optical element according to claim 1, wherein a material for the first optical component and the third optical component is a glass.

5. The optical element according to claim 1, wherein Formulae (3) and (4) are satisfied:

$$9.0 \leq \alpha2/\alpha1 \leq 24.5 \quad (3), \text{ and}$$

$$5.0 \leq \alpha2/\alpha3 \leq 11.0 \quad (4),$$

where $\alpha2$ is a coefficient of linear expansion of the second optical component at 20 degrees Celsius to 60 degrees Celsius.

6. The optical element according to claim 1, wherein Formula (5) is satisfied:

$$0.005 \leq t2e/t2c < 0.95 \quad (5),$$

where t2c is the maximum thickness of the second optical component in the optical axis direction and t2e is the thickness of an outer diameter.

7. The optical element according to claim 6, wherein the t2e/t2c satisfies $0.005 \leq t2e/t2c \leq 0.05$.

8. An optical apparatus comprising:
   a casing; and
   an optical system including a plurality of lenses within the casing,
   wherein at least one of the lenses is the optical element according to claim 1.

9. An imaging apparatus comprising:
   a casing;
   an optical system including a plurality of lenses within the casing; and
   an image pickup element configured to receive a light that has passed through the optical system,
   wherein at least one of the lenses is the optical element according to claim 1.

10. The imaging apparatus according to claim 9, wherein the imaging apparatus includes a camera.

* * * * *